United States Patent [19]

Malik et al.

[11] Patent Number: 4,586,120

[45] Date of Patent: Apr. 29, 1986

[54] CURRENT LIMIT SHUTDOWN CIRCUIT WITH TIME DELAY

[75] Inventors: Randhir S. Malik, Succasunna; Martin H. Patoka, Randolph, both of N.J.

[73] Assignee: AT&T Bell Laboratories, Murray Hill, N.J.

[21] Appl. No.: 566,919

[22] Filed: Dec. 30, 1983

[51] Int. Cl.⁴ ............................................ H02M 3/335
[52] U.S. Cl. ........................................ 363/21; 363/49; 363/56; 363/80
[58] Field of Search ................... 307/126, 140, 141; 361/18, 94, 98; 363/21, 49, 56, 80, 97

[56] References Cited

U.S. PATENT DOCUMENTS

| | | | |
|---|---|---|---|
| 3,703,679 | 11/1972 | Heidt | 361/18 |
| 3,959,713 | 5/1976 | Davis et al. | 361/18 |
| 4,013,925 | 3/1977 | Tice et al. | 361/18 |
| 4,024,437 | 5/1977 | Suzuki | 361/18 |
| 4,172,276 | 10/1979 | Kameya | 363/19 |
| 4,368,500 | 1/1983 | Conroy et al. | 361/94 |
| 4,386,384 | 5/1983 | Moran | 361/94 |
| 4,400,767 | 8/1983 | Fenter | 363/21 |
| 4,447,841 | 5/1984 | Kent | 363/56 |

Primary Examiner—Patrick R. Salce
Assistant Examiner—Jeffrey Sterrett
Attorney, Agent, or Firm—Alfred G. Steinmetz

[57] ABSTRACT

An off-line switcher flyback-type power converter circuit is designed having energy and operative control circuits operating off a tertiary winding of the power transformer. A delayed current shutdown circuit permits starting in the face of high demand current loads whereby the load is supplied with bursts of current as start up is cyclic and delayed shutdown is also cyclic in this situation.

5 Claims, 1 Drawing Figure

CURRENT LIMIT SHUTDOWN CIRCUIT WITH TIME DELAY

TECHNICAL FIELD

This invention relates to power converter circuits which may be powered directly by commercial AC power and, in particular, to a current limit arrangement suitable for such circuits.

BACKGROUND OF THE INVENTION

It is customary to provide current limiting in a converter circuit for the purpose of protecting both the converter circuit itself and the load it is connected to. Normally the current limit circuit responds to an overload condition by operating in a constant current mode, and when appropriate, turning the converter off with a resumption of operation being prohibited until some reset operation is performed. Sometimes a provision is made to permit an automatic restart, however, this normally implies complex control circuitry which adds to the circuit cost. Hence at lower power levels, these features normally requiring complex control circuitry are often not included. This limits the performance of the converter especially during start up if the converter is connected to a high current demanding load. Typically the initial current surge demanded by the load triggers the current limit circuit causing the converter to shutdown. This means that a load demanding an initial high current surge at start up may never permit the converter to start up and reach steady-state operation.

SUMMARY OF THE INVENTION

A plug-in, off-line switcher or DC-to-DC converter circuit embodying the principles of the invention utilizes a delay current limit circuit to cyclically startup and shutdown the power supply in response to an overload condition persisting beyond a preset time interval. More particularly, provision is made to limit output power with a peak current limit control located on the primary side of the converter's transformer. Shutdown of the converter circuit in response to a peak current overload is delayed to permit momentary overloads. After shutdown has occurred, the converter automatically goes through a restart cycle. The current limit and delay shutdown feature will cause the converter to continue to recycle on and off as long as the overload persists. The delay current limit feature permits quantized bursts of current to be delivered to an output, thereby assuring that high initial current demand loads such as capacitive or negative resistance loads can be started and not cause an immediate permanent shutdown.

BRIEF DESCRIPTION OF THE DRAWING

An understanding of the invention may be readily attained by reference to the following detailed description and the accompanying drawing in which the FIGURE discloses a schematic of a converter circuit embodying the principles of the invention.

DETAILED DESCRIPTION

Figure 1:
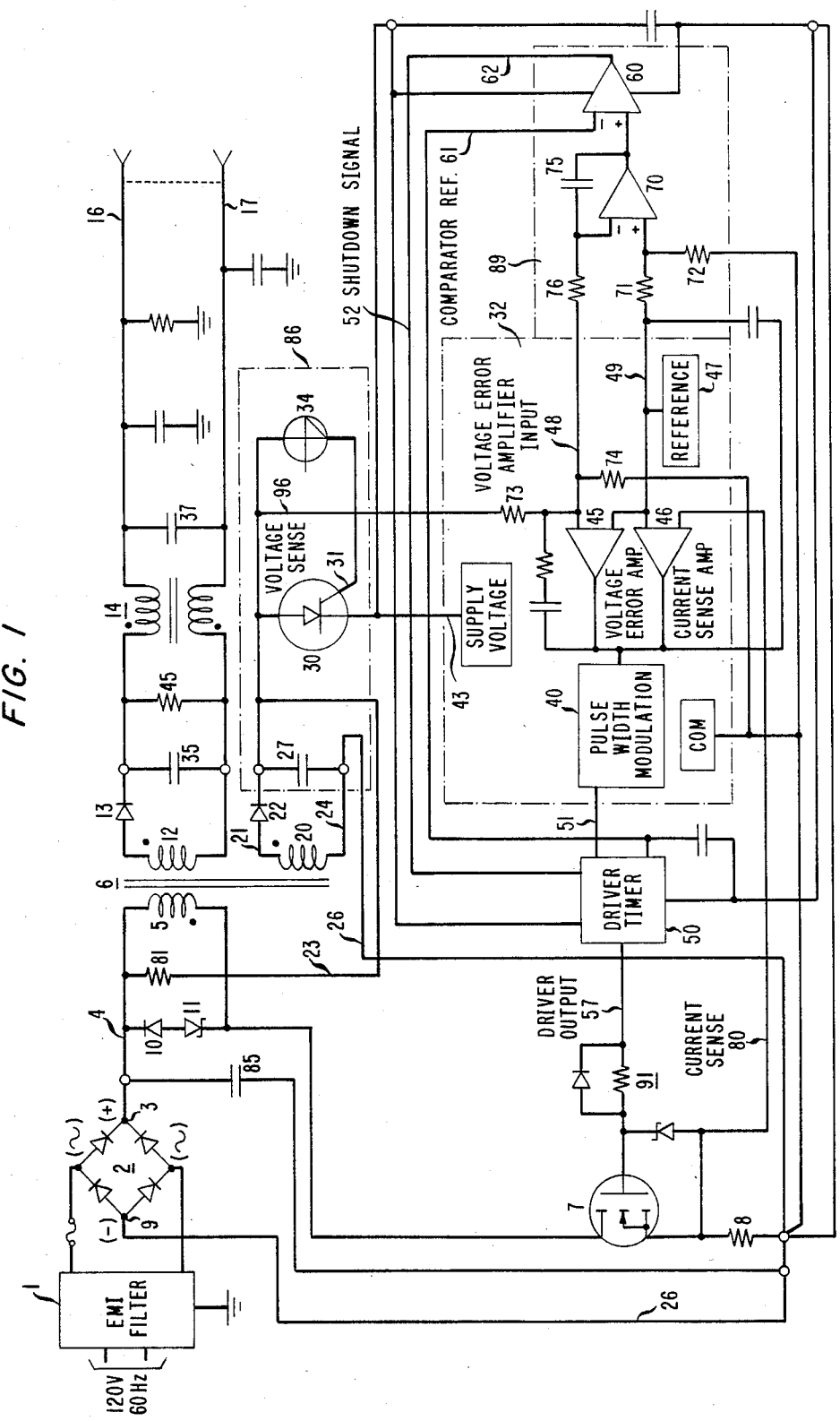

A flyback-type power converter suitable for use as a plug-in type off-line switcher is disclosed in the sole FIG. 1. The circuit schematically shown therein can be divided into three logical subcircuit sections; namely an input circuit, a power train, and a control circuit.

The input circuit consists of a line filter 1, a full wave diode bridge 2 and a filter capacitor 85. The line filter 1 serves to prevent high frequency electrical noise generated by the power train from feeding back into the commercial AC power line.

A flyback converter type power train is coupled to receive an input DC voltage from the filter capacitor 85 and is operative through transistor switch 7, transformer 6 and rectifying diode 13 to convert this voltage to another DC voltage level at output terminals 16 and 17. The transformer 6 serves both as a means of electrical isolation and as an energy storage element. Energy is stored in the magnetic field of 6 when the transistor switch 7, a MOSFET device, is on. This energy is stored by the current through the high voltage capacitor 85, primary winding 5, transistor 7 and current sense shunt 8. When transistor switch 7 is conducting, the winding phasing or orientation of primary 5 and secondary windings 12 and 20 are coupled such that the output and bias rectifier diodes 13 and 22 are reverse biased during conduction in the primary. When transistor 7 is nonconducting, a voltage reversal occurs on the windings of transformer 6 causing rectifier diodes 13 and 22 to conduct current, delivering the energy previously stored in transformer 6 to the capacitive filter and energy storage elements 35 and 27, respectively. A snubber circuit comprising diode 10 and Zener diode 11 serves to dissipate energy stored in the primary leakage inductance of transformer 6 and to limit the peak voltage which transistor switch 7 experiences.

The on or conduction time of transistor switch 7 is varied in response to a control circuit 32 in order to compensate for variations in load applied to the output 16, 17 and input voltage. The bias output which occurs across capacitor 27 is used to provide energizing power for the control circuit 32 and provide a voltage level which is directly regulated in order to provide indirect regulation of voltage across the output terminals 16,17.

The control circuit 32 is energized by the start circuit 86 and includes error amplifiers 45 and 46 and pulse width modulator 40, gate drive circuitry 50 and 91, and delay shut down circuit 89.

The start circuit 86 comprises resistor 81, coupled to SCR 30 and SUS 34 (Silicon Unilateral Switch) in conjunction with charge storage capacitor 27.

The silicon unilateral switch (SUS) 34 is a monolithic integrated circuit having switching characteristics approximating those of a four layer diode. Its advantage is the stability of its switching voltage over a wide temperature variation. This device is commercially available and is identified graphically with a circuit symbol as shown with SUS device 34 in the drawing. Triggering of the device occurs at a fixed breakdown voltage and the trigger input lead is only used if triggering is desired at a lower voltage than the normal breakdown voltage. In the example herein the gate input lead is not utilized. This device is commercially available, for example, from the General Electric Company.

The operation of the start circuit is best understood by assuming that the control circuit is unenergized with SCR 30, in its blocking state, and assuming an adequate voltage level has accumulated on the input capacitor 85. As the control circuit is not energized, no output power is generated to charge capacitor 27 through diode 22; instead a small current flow through resistor 81 slowly charges capacitor 27 as SCR 30, and SUS 34 and the voltage sense lead 96 are all presenting relatively high impedances. When the voltage across capacitor 27 reaches the breakdown voltage of the silicon unilateral switch (SUS) 34, the device 34 switches on, turning SCR 30 on, via a current pulse to its gate on lead 31. The control circuit is now powered and begins to operate transistor switch 7 as is appropriate, generating output power and maintaining the proper voltage to keep the control circuit running. When SCR 30 turns on, its voltage collapses to a low enough value to allow SUS 34 to turn off. If for some reason the bias output cannot provide enough power to maintain a sufficient voltage on capacitor 27, the current flow through SCR 30 will decrease as the voltage on capacitor 27 falls and eventually SCR 30 will return to the blocking state when its current falls below its holding current.

The control circuit including the voltage and current error amplifiers 45 and 46 and pulse width modulator 40 of a regulating subcircuit is a control combination well known to those familiar with the regulated power supply art. This arrangement in effect comprises two parallel regulation circuits, one for voltage, the other for current, only one of which controls the overall circuit operation at any time. For output loads up to some predefined level the voltage control loop compares a divided version of the voltage on capacitor 27, using error amplifier 45 to compare the voltage with the voltage of reference voltage source 47. This error voltage at the output of amplifier 45, is converted into a pulse width by pulse width modulation circuit 40 in such a fashion as to vary the on or conduction time of transistor switch 7 and control the energy throughput of the power train circuitry to maintain the voltage on capacitor 27 and hence across the load connected to output terminals 16 and 17 as a constant voltage. It is the nature of this type of control loop to maintain the two inputs to amplifier 45 at substantially the same voltage.

The current sense amplifier 46 compares the current through transistor switch 7, which is sensed as a voltage across current sensing resistor 8 to the voltage supplied by reference voltage source 47. Peak current level through the transistor switch 7 increases with increasing load coupled to output terminals 16 and 17. Current limit is achieved by controlling the on or conduction time of transistor switch 7 by the error signal of amplifier 46 applied through pulse width modulator 40 and 50 so as to maintain the peak current as a constant. This feature both protects the power unit and the load.

The gate drive circuit consists primarily of driver timer 50 and a voltage shaping network 91. The output of timer 50 on lead 57 is a substantial replica of the modulated pulse input present at lead 51. The actual driver timer component used is the industry standard 555 type timing circuit which is widely available in integrated form and being well-known to those skilled in the art need not be further discussed. Voltage shaping network components between 57 and the gate of transistor switch 7 are used to control the switching characteristics of transistor switch 7.

The delay current limit control circuit 89 comprises amplifiers 60 and 70, and voltage divider 71 and 72. Circuit 89 is operative to detect the presence of a current limit condition related to the output current and provide a shutdown signal after some time delay. This delay current limit function is accomplished by integrating the difference between the reference voltage of soure 47, as a voltage divided by resistors 71 and 72, and a divided voltage due to resistors 73 and 74 of the voltage across capacitor 27, which is the regulated voltage. While the control circuit 32 is in the voltage regulation mode, these two voltage inputs to voltage error amplifier 45 are constrained to be substantially equal. A slightly reduced version of the reference voltage 47 is provided by the voltage divider comprising resistors 71 and 72, and coupled on lead 49 to the shutdown circuit's integrator 70 to allow positive identification of voltage regulation conditions. The integrator 70 including capacitor 75 is a standard circuit configuration. When the converter is forced into current limit by excessive loads, the voltage regulation loop can no longer maintain the voltage input at lead 48 at the reference voltage level supplied by source 47. The voltage presented to the integrator through resistor 76 falls below the voltage on lead 49 and the output of integrator 70 begins to rise as the voltage difference is integrated. A subsequent comparator 60 coupled to receive the output of integrator 70 utilizes a reference voltage, which in this realization is available from the driver timer 50, to provide a clean shutdown signal when the output voltage of integrator 70 exceeds this arbitrary reference voltage level. The length of the delay is dependent on the severity of the overload on the converter. The output of comparator 60 is applied to inhibit the operation of driver timer 50, preventing the MOSFET transistor switch 7 from switching on and effectively shutting the converter down. The choice of the integrating elements is impacted by the selection of the breakdown voltage of the SUS 34, the regulated value of the voltage on capacitor 27, and the expected time required to start the converter under normal loading conditions.

In the power supply circuit, the combination of the delay shut down and start circuit allows for a very desirable operational characteristic that as stated above permits starting with large current demand loads. After comparator 60 transmits a shutdown signal to driver timer 50, the switching of transistor switch 7 ceases and the voltage on both energy storage capacitors 35 and 27 collapses. As the voltage on capacitor 27 collapses, the current flowing through SCR 30 falls until it reaches below the holding current level and SCR 30 returns to its blocking state. At this point the recharging of capacitor 27 through 81 again begins to proceed in the normal start sequence.

Thus the power converter will continually try to restart a load which may have experienced only a temporary overload and periodically automatically restart. This delay shutdown feature allows the converter to start a high current demand while operating deeply into the current limit mode provided that the output voltage can be brought to its regulating value in some finite time, but is also advantageously sensitive enough to prevent operation into a slight overload indefinitely.

What is claimed is:

1. A DC-to-DC converter comprising:
input means for accepting an AC voltage source and rectifying it to a DC voltage,
output means for accepting a load to be energized,
a power transformer including a primary winding, a secondary winding and a tertiary winding,
a rectifier for coupling the secondary winding to the output means,
a power switch coupling the input means to the primary winding,
control means for determining a periodic conduction interval of the power switch, means responsive to a voltage of the input means for repeatedly applying start-up energy subsequent to a shutdown to enable the control means, the means responsive to a voltage of the input means for repeatedly applying start-up energy including charge storage means coupled to be charged by the input means and breakdown means responsive to a charge threshold of the charge storage means coupled to be charged by the input means, the breakdown means being coupled to supply an enabling impulse to the control means, means for steady-state energizing the control means from the tertiary winding, the means for steady-state energizing including a controlled switching device to couple the tertiary winding to continually energize the control means, current limit means responsive to current flow in the power switch including means for delaying shutdown for a finite time interval upon detection of the overload, the means for delaying including means for integrating a voltage representative of a voltage of the tertiary winding, whereby due to a periodic start-up from repeatedly applying start-up energy, increments of current are supplied to a load during an overload condition.

2. A DC-to-DC converter comprising:

input means for accepting a DC voltage source, a power switching device for periodically coupling the input means to a primary winding of a power transformer, a secondary winding of the power transformer being coupled to an output circuit, a tertiary winding of the power transformer coupled to a charge storage device, a control circuit energized by the tertiary winding and the charge storage device coupled through a driver circuit to periodically bias the power switch into conduction, means for initiating a start-up of the converter including switching means responsive to a predetermined amplitude of voltage on the charge storage device to breakdown and couple an energizing signal to the control circuit, the means for initiating a start-up comprising a silicon unilateral switch coupled to be energized by a voltage on the charge storage device and further coupled to a trigger control of a SCR connected to couple energy from the charge storage device to the control circuit, means to supply charge to the charge storage device from the means for providing a DC voltage source, and said control circuit including means for responding to an overcurrent condition to shutdown the power switch, said means for responding including time delay means to delay shutdown for a preset short-time interval.

3. A DC-to-DC converter as defined in claim 2 wherein the time delay means comprises means for integrating a signal representative of an output voltage and means for signal comparison responsive to the means for integrating for inhibiting the driver circuit.

4. A DC-to-DC converter as defined in claim 3 wherein the control circuit includes a voltage error amplifier coupled to respond to a reference voltage and an output voltage of the converter, an output of the voltage error amplifier controlling a pulse-width modulator signaling the driver circuit.

5. A DC-to-DC converter as defined in claim 4 wherein the means for responding to an overcurrent condition includes a current sensing component connected in series with the power switch and a current error amplifier responsive to the current sensing component and having its output coupled to the pulse-width modulator.

* * * * *